July 29, 1947.  J. A. SENN  2,424,858
COLORIMETER
Filed Jan. 25, 1945  2 Sheets-Sheet 1

INVENTOR.
JURG A. SENN
BY
Henry G. Bartok

July 29, 1947.  J. A. SENN  2,424,858
COLORIMETER
Filed Jan. 25, 1945  2 Sheets-Sheet 2

INVENTOR.
JURG A. SENN
BY
Henry G. Bartsch

Patented July 29, 1947

2,424,858

UNITED STATES PATENT OFFICE 2,424,858

COLORIMETER

Jurg A. Senn, Washington, D. C.

Application January 25, 1945, Serial No. 574,534

6 Claims. (Cl. 250—41.5)

This invention relates to comparison-type optical apparatus and particularly to devices of this class which utilize one or more light beams the cross-sectional areas of which may be varied. My invention finds its most valuable, present application in turbidimeters or colorimeters wherein a beam of light from a suitable source is intercepted, first by a light absorbent standard and second, by a sample being tested before falling upon a photocell in the path of said beam. A second light beam from the same source is made to fall upon a second photocell which is spaced from the first. Suitable means is provided to indicate when the photocells are equally illuminated. A calibrated shutter is arranged variably to intercept the second light beam. The corrected width of the second light beam to enable the indicator to show equal illumination of both photocells when the standard is replaced by the test sample in the path of the first beam serves as a measure of the turbidity or coloring material in the sample.

It is an object of my invention to provide a colorimeter which is of rugged construction and will maintain its accuracy under extreme service conditions.

A further object of my invention is to provide an adjustable shutter for optical test apparatus characterized by simplicity, ruggedness, ease of operation and low cost.

Another object of my invention is to provide a turbidimeter which will maintain its accuracy under severe service conditions such as are encountered by portable test equipment in the field and shop and also obtain on shipboard, particularly war vessels, in the periodic determination of the oil content of boiler water.

Photoelectric comparison apparatus for laboratory use generally includes a simple shutter for varying the width of the light beam falling upon the photocell. The design of this shutter being uninfluenced by severe service conditions such as vibration, violent movement of its mounting, etc., is usually a simple, variable apertured slit. A single slide element movable in longitudinal guides by means such as a rack and pinion and cooperating with a stationary element constitutes one type of laboratory shutter and is employed in the McFarlan et al. Patent #2,123,573. The shutter may also comprise two slidable elements which are simultaneously moved by the rack and pinion as in the Exton Patent #1,954,925. Such devices are inherently of limited accuracy due to the necessary tolerance between the sliding elements and their guides and the backlash of the rack and pinion. This accuracy is further impaired when such shutters are operated under conditions of vibration as on shipboard. The turbidimeter hereinafter described overcomes the above disadvantages through the utilization of components selected and/or designed for their shock-resistant characteristics and provides a rugged, practical and highly accurate instrument.

The shock-resistant characteristics of my shutter are provided by utilizing a curved surface as the light intercepting element and rotating the same across the path of the light beam by means of a suitable edge portion inclined to the axis of rotation of the element. Preferably, the light intercepting element is the movable one of a plurality of helically-threaded members, the other of which is rigidly mounted on a stationary portion of the instrument.

In the accompanying drawings illustrating the application of my invention,

Figure 1:
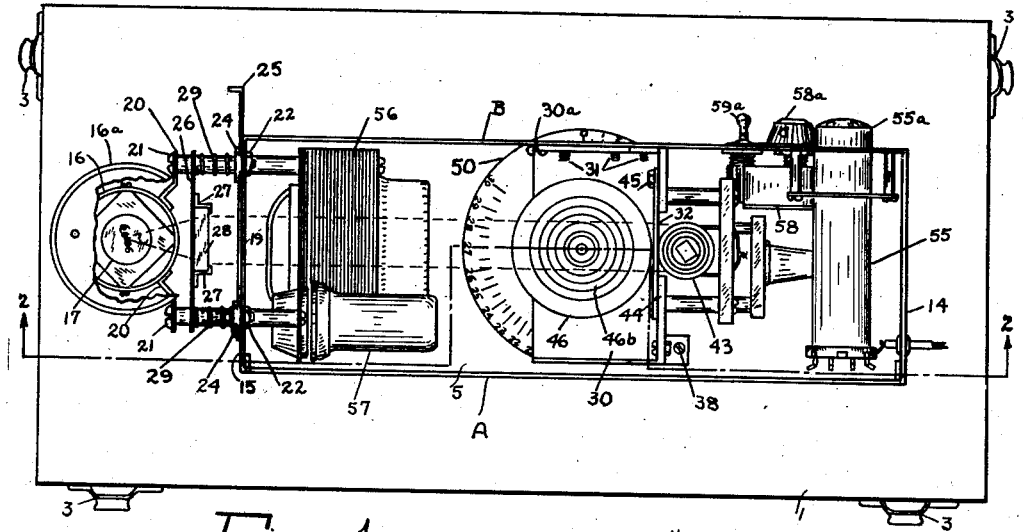
Fig. 1 is a plan view partly in section, taken on the line 1—1 of Fig. 2 and showing a preferred form of my invention with certain parts above the shutter being omitted for clarity.
Figure 2:
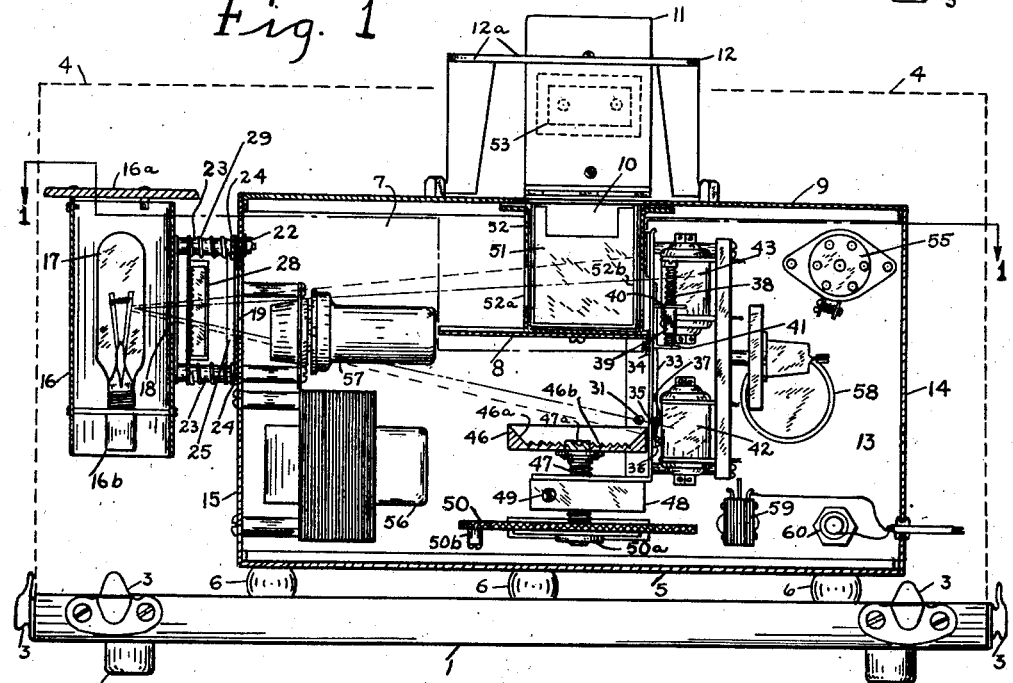
Fig. 2 is a front elevation partly in section taken on the line 2—2 of Fig. 1.
Figure 5:
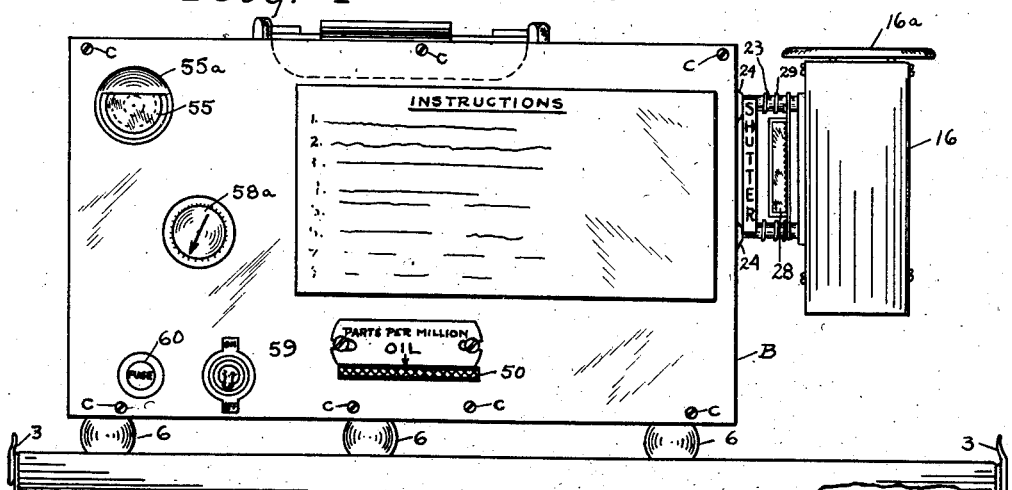
Fig. 5 is an elevational view taken from the rear of Fig. 2 and showing the cover plate in position and the carrying handle in its lower position.

Referring now to Figs. 1 and 2 there is shown at 1 a base of a portable carrying case provided with the usual resilient feet 2 and latching means 3 for detachably connecting the base 1 to an upper cover indicated at 4 as will be readily apparent. The cover may be provided with a conventional carrying handle (not shown). The housing for the instrument which serves also as a mount for the various components is preferably formed of two pieces of sheet metal. One sheet A includes a base 5 mounted on the base 1 of the carrying case by rubber feet 6, a rear wall 7 provided with a horizontal shelf 8 for supporting the test cell compartment later to be described and a top wall 9 having an opening 10 for the cell and a door 11 for closing the same and a carrying handle 12. The other piece B of sheet metal serves as a mount for all the instrument components except the test cell assembly referred to and includes a front wall 13 and side walls 14 and 15. Sheets A and B are detachably connected along their overlapping edges by screws C (Fig. 5).

At the left of Figs. 1 and 2 there is shown a lamp housing 16 having a top 16a spaced to provide ventilation and a socket 16b for the projector type lamp 17. A vertically elongated slit 18 is provided in the housing 16 to the right of lamp 17 and a similar slit 19 is provided in the side wall 15 in alinement therewith. Front and rear U-shaped brackets 20 fixed to housing 16 are apertured to receive stand-off scrws 21 which extend through wall 15 and have securing nuts 22 threaded thereon. Spacer collars 23 surround the screws 21 and at their left ends abut the brackets 20 and at their right ends the washers 24 have inwardly turned ears to provide guides for a laterally movable shutter 25 apertured as shown in Fig. 2. A carrier plate 26 provided with vertical angle strips 27 for retaining a filter 28 is apertured at the corner portions thereof to receive the collars 23, springs 29 surrounding the collars serving to press the plate 26 to the left against any desired stop members (not shown).

A mounting plate 30 having horizontally and vertically disposed portions and angular flanges 30a attached to the wall B as by fastening means 31 is provided with a central cutout 32 (Fig. 1) blocked centrally for its major extent by a flat, relatively wide shutter element 33 pivoted at 34 to the plate 30 and biased upwardly by a wire spring 35 looped about a pin 36 on plate 30. The upper end of spring 35 engages a bent-out portion 37 of shutter element 33 and the latter's vertical position is regulated by means of a contact screw 38 engaging a bent-out portion 41 of shutter element 33 and threaded into an elongated nut 39 which is pressed into an angle bracket 40 mounted on the plate 30. Screw 38 may be held in its adjusted position by slitting and slightly compressing the lower portion of nut 39. It will be observed that as the screw 38 is turned to move upwardly, the shutter element 33 will also move upwardly to enlarge the lower slit through which light passes to lower photocell 42 and simultaneously reduce the upper slit through which light passes to the upper photocell 43. An upper shutter element 44 (Fig. 1) adjustably mounted on plate 30 by a single mounting 45 cooperates with the upper edge of shutter element 33 to raise or lower the slit adjacent the photocell 43 as well as vary its width as desired.

The calibrated shutter of my improved colorimeter now to be described, is radically different from the rectilinear shutters shown in the prior art to which reference has been made and by reason of such difference marked superiority in the operating characteristics of my test instrument result. In its simplest form it consists of a curved, light-opaque wall carried by a rotating disc or other support across the path of the light beam as the support is rotated. The light-intercepting edge of the wall may be inclined or cam-shaped so that simple rotation of the support will move the edge into or out of the light path. It will be readily apparent that the slightest axial movement, or lateral movement of the rotary system with respect to the stationary portion of the instrument on which the photocell and light source are mounted will introduce a serious error into the indicated value. For this design to be utilized within the limits of required accuracy, the rotating parts must be carefully fitted to eliminate both side play and end play. By mounting the support for the shutter-wall on a rotating shaft journaled on spaced, precision, thrust bearings in opposition, end play as well as side play is reduced to a minimum, particularly if the spacing between the bearings approaches the axial length of the rotary shaft.

The preferred form of my invention, however, utilizes the principles inherent in the arrangement just described in a materially simplified structure that is not only more cheaply built but is equally as accurate as the form first described, if not more so. Referring now to Fig. 2, there is shown a curved shutter-element 46 having an intercepting edge-portion of regular contour, and preferably provided with an inwardly inclined wall 46a and a series of concentric ridges 46b which are saw-toothed in cross-section as shown in Fig. 2. Ridges 46b serve to prevent vagrant light from being reflected into the slit and upon the lower photocell 42. The inner wall 46a and the ridges 46b of the shutter element, in fact the outer surface of the latter in its entirety as well as the inner walls of the casing that are exposed to light from the source are preferably blackened with a non-reflecting coating to lessen such unwanted reflections.

The shutter element 46 is mounted on the shouldered end of a helical, precision screw 47 and for all practical purposes made integral therewith by any suitable securing means such as nut 47a. Screw 47 is threaded through a split supporting block 48 which is suitably united to the split, horizontal portion of plate 30 by any suitable means (not shown). A clamping screw 49 extends across the open ends of the split portion of block 48 to adjust the frictional grip upon the screw 47. A dial 50 is secured to the lower end of the screw 47 as by means of nut 50a and a stop 50b near the periphery of the dial is provided to conveniently limit the motion of the dial to less than one revolution due to contact with the front wall B. It will be observed (Figs. 1 and 5) that the marginal portion of dial 50 bears suitable indicia and reference to its angular travel from a zero position and extends through a horizontal slit in the wall B to facilitate its turning by hand.

Movement of dial 50 will rotate the screw 47 and thus raise or lower the curved edge of the shutter element 46 to decrease or increase the amount of light striking the lower photocell 42. Preferably the center of curvature of the shutter element 46 falls on the axis of the screw 47 so that equal angles of rotation for the dial 50 will vary the light reaching the lower photocell by equal increments. To insure the equal movements described and to simplify calibration, the shutter element is fixed in place on the end of screw 47 and the latter is then rotated between centers as on a lathe and the height as well as uniform radius of the shutter carefully verified and corrected where necessary by the removal of surplus metal. If the curvature of the wall is other than as stated, manufacturing difficulties in achieving uniformity of product are greatly increased. I prefer to employ a thread of fine pitch, for example, 28 threads per inch for the screw 47 and its associated block. This together with the thickness of the latter extending over many threads of the screw provides a fine, uniform and durable adjustment which may be maintained at any desired frictional setting by means of clamping screw 49. To further increase the rigidity of the mounting for the block 48, the horizontal portion of plate 30 may be diagonally braced to the vertical portion by strips welded thereto, for example.

The hollow test cell 51 (Figs. 2 and 4) is closely fitted into a plush-lined compartment 52 secured to the top wall 9 and supported from beneath by the shelf 8. The end walls of compartment 52 are apertured at 52 and 52a as shown to permit the upper light beam from the lamp 17 to pass through the cell and strike the photocell 43. Door 11 is hinged to the top 9 to permit insertion of the cell 51 and in its lower position (Fig. 4) clamps the same against shifting through the pressure exerted against the top edges of the cell by the resilient spacer means indicated at 53. It will be further observed that the central carrying portion 12a of handle 12 extends flatwise at an angle of 90 degrees to the legs thereof and thus lies alongside the rear wall 7 when the handle is in lowered position. The operator may thus steady the instrument and immobilize the cell in its compartment with one hand while he adjusts the instrument controls on the front wall B with the other.

Figure 3:
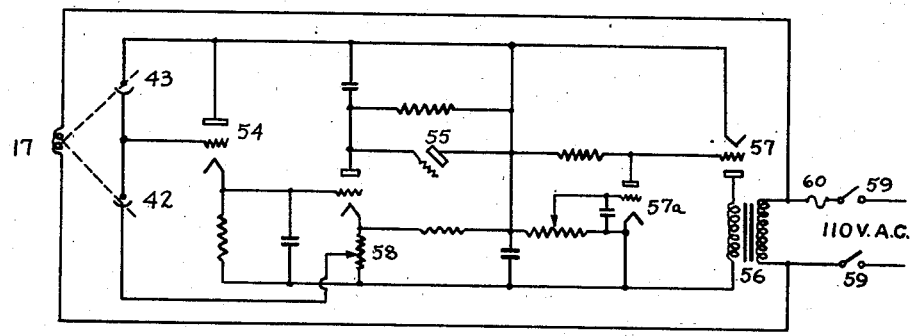
Fig. 3 is a schematic diagram of the circuit utilized in my invention.

Fig. 3 shows schematically a circuit arrangement that is well suited to my colorimeter as heretofore described and wherein the photocells 42, 43 are connected to the grid of a cathode follower current amplifier 54. Cathode ray tuning eye 55 beneath its light shield 55a indicates when equal illumination of the photocells has been attained. The 110 volt A. C. line through switch 59 and fuse 60 supplies power to transformer 56, the output of which is rectified with the voltage-regulated, half-wave rectifier 57. The action of this voltage regulator is dependent upon the half-wave rectifier triode and serves to apply any variation in the input voltage to both the plate and grid of a vacuum tube in such a manner that the plate current remains constant. The voltage variation is amplified with tube 57a before being applied to the grid of tube 57.

The operation of my colorimeter is as follows: Having first adjusted the flat shutter nearest the photocells to obtain equal opening and proper centering on the photocells, the bias on the indicator tube 55 is adjusted to obtain a reference deflection of its closing shadow angle. A decrease of light on photocell 43 due to the luminous absorption of a specimen will open the shadow of tube 55. A decrease of light falling upon photocell 42 effected by the gradual interception of this light by the calibrated opaque shutter will again bring the shadow of tube 55 back to the original reference position, indicating equal excitation of the two phototubes. The position of disc 50 with reference to the index is an accurate measure of the difference in luminous absorption between a reference standard and the specimen under test.

Figure 4:
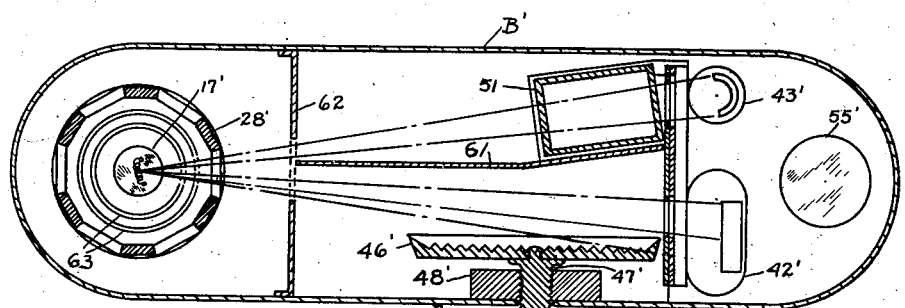
Fig. 4 is a plan view partly in section of a modified form of turbidimeter.

In Fig. 4 I have shown a modified form of my invention in which a filter carrier surrounding lamp 17 is arranged to be rotated to bring any desired filter element 28′ into the path of light from lamp 17. The filter 28 employed in the preferred form of my invention produces vertical dispersion of the light beam to give proper illumination of the spaced photocells and also serves to keep most of the heat from lamp 17 from entering the instrument casing. By means of the circular filter arrangement of Fig. 4 a wide selection of filters may be quickly available for use, adding to the versatility of the instrument as an all purpose colorimeter. In the modification of Fig. 4 the frusto-conical shutter element 46′ mounted on the precision screw 47′ threaded into the block 48′ is rotated by disc 50′ which is held in place by nut 50a′. Suitable clamping means (not shown) for the block 48′ will be provided as in the preferred form of my invention. Also in this figure as in Figs. 1 and 2 the entering edge of the shutter travels into and out of the beam along an axis parallel to the axis of the photocell 42′, the shutter block, however, is mounted on a side wall rather than the base of the instrument. The inner walls 61 and 62 separate the main light beam from the filter element into two paths to the respective photocells 42′ and 43′. The tuning eye indicator 55′ may conveniently be located on the top wall as shown.

It will be apparent that the application of my novel shutter to optical apparatus is not limited to the precise embodiments which have been described. Its design, therefore, while particularly adapted to the arrangements shown is not to be considered to be restricted thereto but only as defined in the appended claims.

I claim:

1. In apparatus employing a light source and a photocell in the path of light therefrom, shutter means comprising a substantially cylindrical wall having an edge portion adjacent said path and supporting means therefor including a stationary portion and a wall-carrying portion which is rotatable about the axis of said wall, at least one of said portions being inclined to said axis whereby rotation of said wall-carrying portion will move said edge portion axially into and simultaneously across said light path.

2. In apparatus employing a light source and a photocell in the path of light therefrom, shutter means comprising a substantially cylindrical wall having an edge portion inclined to the axis of said wall and adjacent said beam and supporting means therefor including a stationary portion and a wall-carrying portion rotatable therein whereby rotation of the latter will move the inclined edge of said wall axially into and simultaneously across said light path.

3. In apparatus employing a light source and a photocell in the path of light therefrom, shutter means comprising a substantially cylindrical wall having an edge portion adjacent said path, a threaded stationary support and similarly threaded wall-carrying means rotatable therein to advance or axially retract said edge portion into and simultaneously across said beam as desired.

4. In apparatus employing a light source and a photocell in the path of light therefrom, a shutter comprising a cylindrical wall having an edge portion adjacent said path, a stationary support provided with a screw-threaded bore axially of said wall and inclined to said path, similarly threaded wall-carrying means rotatable in said bore to advance or retract said edge portion axially into and simultaneously across said beam, and a stationary indicator cooperating with said last named means to indicate the rotated position of the latter.

5. In apparatus employing a light source, a beam of light therefrom and a photocell having a semi-cylindrical light sensitive surface in the path of said beam, a shutter comprising a substantially cylindrical wall the axis of which is parallel to the axis of said surface and having an edge portion adjacent said path, a threaded stationary support and similarly threaded wall-carrying means rotatable therein to advance or retract said edge portion axially into and simultaneously across said beam to thereby linearly affect the quantity of light following upon said surface.

6. A shutter for a comparison, light-beam colorimeter comprising a substantially cylindrical light-intercepting wall, an integral mounting for said wall including a helically threaded stud coaxial with said wall, a stationary support having an identically threaded bore receiving said stud for rotation therein and means associated with said support for varying the force of friction between the latter and said stud.

JURG A. SENN.

REFERENCES CITED

The following references are of record in the file of this patent:

UNITED STATES PATENTS

| Number | Name | Date |
|---|---|---|
| 2,036,447 | Tuttle et al. | Apr. 7, 1936 |
| 2,134,982 | Mock | Nov. 1, 1938 |
| 2,191,026 | Olson | Feb. 20, 1940 |
| 2,268,133 | Carlson | Dec. 30, 1941 |
| 2,301,419 | Lew | Nov. 10, 1942 |
| 2,372,937 | Dircksen et al. | Apr. 3, 1945 |
| 1,951,018 | Herdman | Mar. 13, 1934 |
| 2,073,223 | Rose | Mar. 9, 1937 |